United States Patent [19]

Goossens et al.

[11] Patent Number: 4,861,664

[45] Date of Patent: Aug. 29, 1989

[54] PROCESS FOR UV STABILIZER IMPREGNATION OF PLASTIC SURFACES

[75] Inventors: John C. Goossens, Mt. Vernon, Ind.; Arnold Factor; Peter M. Miranda, both of Scotia, N.Y.

[73] Assignee: General Electric Company, Pittsfield, Mass.

[21] Appl. No.: 140,106

[22] Filed: Dec. 31, 1987

[51] Int. Cl.$^4$ .......................... B32B 27/36; B05D 5/00
[52] U.S. Cl. .................................. 428/409; 427/160; 427/316; 427/307; 427/384
[58] Field of Search ............... 427/160, 307, 316, 384; 428/409; 548/261, 253, 258; 426/59

[56] References Cited

U.S. PATENT DOCUMENTS

| | | | |
|---|---|---|---|
| 2,920,978 | 1/1960 | Randall | 427/160 |
| 3,309,220 | 3/1967 | Osteen | 427/160 |
| 3,892,889 | 7/1975 | Cohnen et al. | 427/160 |
| 4,000,148 | 12/1976 | Pond et al. | 427/160 |
| 4,322,455 | 3/1982 | Olson et al. | 427/160 |
| 4,600,647 | 7/1986 | Robeson et al. | |

FOREIGN PATENT DOCUMENTS 1197246  1/1982  Canada ................... 249/20

*Primary Examiner*—Janyce Bell
*Attorney, Agent, or Firm*—Spencer D. Conard

[57] ABSTRACT

A process of producing a thermoplastic article having resistance to degradation by ultraviolet radiation, which comprises impregnating the surface of the thermoplastic article with a UV-absorbing effective amount of a solution of a multimeric benzotriazole compound at a surface impregnation effective elevated temperature.

17 Claims, No Drawings

PROCESS FOR UV STABILIZER IMPREGNATION OF PLASTIC SURFACES

BACKGROUND OF THE INVENTION

Most organic polymeric materials undergo some degradation when exposed to the high energy photons of ultraviolet radiation. The degradation manifests itself, depending on the polymeric material, in yellowing, discoloration, embrittlement and other loss of physical properties. Polycarbonate resin is no exception and it is, therefore, an object of this invention to provide a method of producing a polycarbonate resin article which is highly resistant to ultraviolet radiation degradation.

Ultraviolet radiation absorbers have been used with various resins, such as polycarbonates, acrylics, polyesters, polyolefins, vinyls, and polystyrene to provide protection against attack by ultraviolet radiation. The ultraviolet radiation absorber generally has a very high UV absorptivity relative to that of the polymer and functions by screening out the damaging ultraviolet portion of light. To qualify as a successful ultraviolet light absorber for a polymer, particularly for polycarbonate, the absorber should fulfill several requirements. The absorber advantageously has a high specific absorptivity in the range of wavelengths that are most deleterious to the polymer and that are present in the source of the exposure. The absorber should also be compatible with the polymer and not substantially deleteriously affect its physical properties. For most applications, the absorber preferably does not significantly absorb light in the visible region of the spectrum, or a color will be imparted to the polymer. Stabilization of polymers against ultraviolet radiation has typically been accomplished by blending effective amounts of UV absorber with the polymer prior to forming operations. Recently, a technique has been developed which involves impregnating the surface of the polymer with a UV absorber. For example, U.S. Pat. No. 4,322,455 to Olson discloses a process for producing an ultraviolet stabilized polymeric, particularly polycarbonate, article comprising impregnation of the surface of the article with an ultraviolet radiation absorber by heating the polymeric article and applying onto the surface of the heated article an ultraviolet radiation absorbing compound dissolved in a nonaggressive carrier.

Surface impregnation of polymers has several advantages over incorporation of the UV absorber throughout the polymer matrix. Generally, less UV absorber is required to achieve the same or greater degree of polymer stabilization. Since the UV absorber resides only at the surface of the polymer, the effects of the UV absorber on the physical properties of the polymer are minimized. Moreover, surface impregnation temperatures are generally milder than those encountered during forming operations such as extrusion or injection molding. Therefore, thermal degradation of the UV absorber is less of a concern with surface impregnation techniques.

Nevertheless, current surface impregnation procedures have been attended by certain disadvantages. Because the UV absorber is applied in solution to the polymer surface, relatively low molecular weight compounds, which are soluble in the solvent employed, have typically been used. The polymeric materials often are subjected to elevated temperatures subsequent to surface impregnation. These temperatures may be encountered, for example, in thermoforming operations or in high temperature applications of the polymer product. Conventional UV absorbers that have been applied by surface impregnation often are somewhat volatile at such temperatures. Substantial amounts of the UV absorber can be lost through volatilization at elevated temperatures. Accordingly, a need exists for a surface impregnation, non-volatile UV absorber which can be impregnated into the surface of a polymer yet not substantially alter the physical properties of the polymer.

SUMMARY OF THE INVENTION

In accordance with the present invention there is provided a process of producing a thermoplastic article having resistance to degradation by ultraviolet radiation, which comprises impregnating the surface of the thermoplastic article with a UV-absorbing effective amount of a solution of a multimeric benzotriazole compound at a surface impregnation effective elevated temperature.

DETAILED DESCRIPTION OF THE INVENTION

The benzotriazole compound employed in the process of this invention is represented by the general formula:

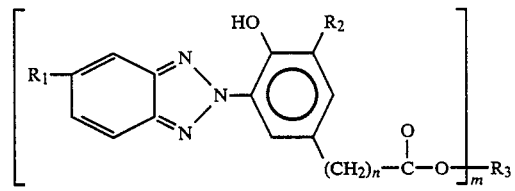

wherein $R_1$ is hydrogen, a halogen, a lower alkyl of from 1 to about 6 carbon atoms or a lower alkoxy of from 1 to about 6 carbon atoms. $R_2$ is hydrogen, halogen, lower alkyl of from 1 to about 6 carbon atoms, or an arylsulfonyl, wherein the aryl group contains from 6 to about 10 carbon atoms; n is an integer from 1 to about 4, m is 2 or 3 and $R_3$ is a divalent or trivalent hydrocarbon radical or lower alkyl ether radical of from 2 to about 22 carbon atoms. In preferred compounds $R_2$ is hydrogen or a lower branched alkyl group of from 3 to about 6 carbon atoms.

Preferably the compound is a benzotriazole dimer where $R_3$ is $-CH_2CH_2-OCH_2CH_2)_y$ or $-(CH_2)_6-$, wherein y is an integer from about 2 to about 4. These compounds have the special attributes of low volatility, good solubility in effective impregnation solvents, high UV light absorptivity, moderate plasticization and high impregnation efficiency. Mixtures of such compounds are especially preferred because of their beneficial effect on solubility.

In preparing the diester (m=2) and triester (m=3) benzotriazole compounds, they sometimes contain a small amount of the monester (m=1) as an impurity. Small amounts of the monoester, up to about 5%, do not deleteriously affect the results of the impregnation procedure.

The process of this invention is generally applicable to any thermoplastic article including those made of polycarbonates, polyestercarbonates, acrylics, polyesters, polyolefins, vinyls, polystyrenes and the like. The process is particularly suited to the UV stabilization of polycarbonates and polyestercarbonates, and the invention will be described in detail with respect to these embodiments.

In accordance with the present invention an article comprised of polycarbonate resin may be formed in a conventional manner, for example by injection molding, extrusion, cold forming, vacuum forming, blow molding, compression molding, transfer molding, and the like. The article may be in any shape and need not be a finished article of commerce, that is, it can be sheet material or film which would be cut or sized or mechanically shaped into a finished article. Therefore, as used herein, it will be understood that the term "article" refers to any shape or form of polycarbonate resin whether finished or stock material.

The aromatic polycarbonates which can be used in the practice of the instant invention have recurring structural units of the formula

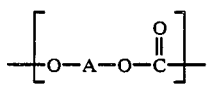

where A is a divalent aromatic radical of the dihydric phenol employed in the polymer-producing reaction. These polycarbonate resins are high molecular weight aromatic carbonate polymers which may be prepared by reacting a dihydric phenol with a carbonate precursor such as carbonyl chloride, a haloformate or a carbonate ester.

The aromatic carbonate polymers of this invention may be prepared by methods well-known in the art and described, for example, in U.S. Pat. Nos. 3,161,615; 3,220,973; 3,312,659; 3,312,660; 3,313,777; 3,666,614; and 3,989,672, all of which are incorporated herein by reference.

Branched polycarbonates may also be used, wherein a polyfunctional aromatic compound is reacted with the dihydric phenol and the carbonate precursor to provide a randomly branched thermoplastic polycarbonate, and the recurring units of formula I contain branched groups.

Preferred polycarbonate resins are those derived from the reaction of bisphenol A with carbonyl chloride. These preferred polycarbonates have from about 10 to about 400 recurring structural units of the formula

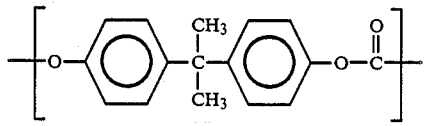

The polycarbonate should preferably have an intrinsic viscosity between 0.3 and 1.0, more preferably from 0.4 to 0.65 as measured at 25° C. in methylene chloride.

Copolyestercarbonate resins may also be surface impregnated in accordance with this invention. Such copolyestercarbonates are described, for example, by Robert A. Pyles in U.S. Pat. No. 4,535,104, which is incorporated herein by reference.

In the preferred embodiment, the ultraviolet radiation compound is applied to the thermoplastic article in the form of a solution which contains a solvent system that is aggressive enough to effect impregnation of the plastic surface when the coated surface is heated to an elevated temperature. However, the solvent system is not so aggressive that it causes excessive softening of the polymer surface or crazing or cracking of the thermoplastic.

Suitable solvent systems include the class consisting of glycol ethers, alcohols, hydroxyethers, halogenated hydrocarbons, esters or ketones. Preferred glycol ethers include 2-butoxyethanol (Butyl Cellosolve ®) and the methyl ether of propylene glycol or a mixture of glycol ethers. Preferably the solvent is a mixture of from about 40% to about 80% of the methyl ether of propylene glycol and from about 20% to about 60% of 2-butoxyethanol.

The process is conducted at a surface impregnation effective elevated temperature, i.e., a temperature at which the liquid carrier will effect impregnation of the UV absorber into the plastic surface. Preferably the surface impregnation effective elevated temperature is between 100° and 150° C., preferably between about 120° and about 135° C.

In a preferred embodiment, the thermoplastic article and UV-absorbing composition are heated together after the absorbing composition is applied to the thermoplastic article. The present invention also envisages processes in which the thermoplastic article is heated to a surface impregnation effective elevated temperature prior to application of the absorbing composition, and processes in which the UV-absorbing composition is heated to a surface impregnation effective elevated temperature prior to application to the thermoplastic article.

In order to more fully and clearly illustrate the present invention, the following specific examples are presented. It is intended that the examples be considered as illustrated rather than limiting the invention disclosed and claimed herein. In the examples all parts and percentages are on a weight basis unless otherwise specified.

EXAMPLE 1

Using a Sharpe Model 450 pressurized spray gun, a thin liquid film of a solution comprising 6 wt % of the triethylene glycol benzotriazole dimer dissolved in a 70/30 blend of 2-butoxyethanol ("EB")/1-methoxy-2-propanol ("PM"), was laid down on the upper surface of a ⅛" thick 12"×18" polycarbonate sheet. The sheet was then placed on a conveyor and passed beneath an infrared heater system to drive the UV screener into the surface and evaporate off the solvent. The cooled, impregnated sheet was washed with solvent to remove any unincorporated screener. Exposure of this and an untreated control sheet to ultraviolet radiation resulted in a 0.2 yellowing index ("YI") (measured with a Gardner Labortory Model XL-835 Colorimeter) increase in the impregnated sheet and 8.6 YI increase in the control sheet. The sheets were exposed for 300 hours in a UV-CON ® accelerated weathering tester.

EXAMPLE 2

A solution of 6 wt % of a substantially pure benzotriazole dimer ($R_2$=t-butyl, m=2, n=2, $R_1$ =H and $R_3$=—$(CH_2)_6$—) in 90/10 PM/EB was flow coated on 5"×8¼" pieces of 20 mil polycarbonate film vertically suspended from a clamp. The wet films were allowed to drain for 1.5 min. and then placed in a Frictionaire(R) forced hot air oven at 129° C. for 1, 2 and 4 minutes. One inch strips were cut from the top and bottom of each sample and absorbances were measured for the 342 nm peak on each before and after solvent washing to removing unimpregnated screener. A piece of untreated film was placed in the reference beam of the Model 552 Perkin-Elmer Spectrophotometer. The results are shown in Table 1 below.

TABLE 1

| | UV Absorbance | | |
|---|---|---|---|
| | 1 Mn Dry | 2 Min Dry | 4 Min Dry |
| UNWASHED: | | | |
| Top | 2.15 | 2.24 | 2.18 |
| Bottom | >3 at 357–337 nm | >3 at 353–330 nm | >3 at 355–328 nm |
| WASHED: | | | |
| Top | 2.10 | 2.10 | 2.18 |
| BOTTOM | >3 at 354–330 nm | >3 at 353–330 nm | >3 at 356–327 nm |

This experiment demonstrates the rapidity with which impregnation takes place and the effect of initial wet film thickness.

EXAMPLE 3

Solutions containing 5.6 wt % of Tinuvin ® 1130 (a mixture sold by Ciba-Geigy Corp. which contains the dimeric benzotriazole ultraviolet radiation absorber identified in Example 1) in 60/40 ratios of PM/1-propoxyethanol ("EP"), PM/n-butylalcohol ("NBA") amd EP/NBA were flow coated on films as in Example 2 and absorbance of top cut strips were measured after 1 min of oven drying at 132° C. and solvent washing to remove unimpregnated UV screener. The results are shown in Table 2.

TABLE 2

| Solvent System | PM/EP | PM/NBA | EP/NBA |
|---|---|---|---|
| 343 nm Absorbance | 1.76 | 1.67 | 1.45 |

These results demonstrate the order PM>EP>NBA for effectiveness of impregnation by these three solvents. Alcohols such as NBA are weakly aggressive toward polycarbonate.

EXAMPLE 4

In an experiment similar to that described in Example 3, the effect of PM and isopropyl alcohol ("IPA") on the very aggressive solvent, methylethylketone ("MEK") were compared using the same flow coat/-drain/oven dry scheme of Example 3, except that Tinuvin ® 900 (a monomeric benzotriazole ultraviolet radiation absorber (2-[2'-hydroxy-3',5'-di(a,a-dimethylbenzyl)phenyl]benzotriazole) marketed by Ciba-Geigy) was substituted for Tinuvin 1130 The results are shown in Table 3.

TABLE 3

| Solvent System | 345 nm Absorbance |
|---|---|
| 60/40 PM/MEK | 1.88 |
| 50/50 IPA/MEK | 1.21 |

EXAMPLE 5

Pieces of film were impregnated as in Example 2, but with a solution of 4% of Tinuvin ®328 (a monomeric benzotriazole ultraviolet radiation absorber (2-(2'-hydroxy-3',5'-di-tert- butylphenyl)benzotriazole) marketed by Ciba-Geigy) in pure PM. The drained wet film was oven dried for 1 minute at three different temperatures. The 346 nm absorbance of each was measured before and after solvent washing to remove unimpregnated UV screener from the surface. The results are shown in Table 4.

TABLE 4

| Oven Temp: | 132° C. | 121° C. | 110° C. |
|---|---|---|---|
| Absorbance unwashed: | 2.16 | 2.13 | 2.64 |
| Absorbance washed: | 2.15 | 1.92 | 0.32 |

EXAMPLE 6

The 110° F. impregnation of Example 5 was repeated at triple the oven residence time, i.e., for 3 minutes with the following results:

Absorbance unwashed: 2.06

Absorbance washed: 1.91

EXAMPLE 7

The dimeric UV-absorber, Tinuvin 1130, was used at 6 wt % in a 90/10 PM/EB solvent blend to impregnate pieces of film using different oven dry times at 129° C. The 342 nm absorbance of a top-cut strip of each was measured before and after solvent washing. The results are shown in Table 5.

TABLE 5

| Dry Time | Absorbance Unwashed | Absorbance Washed |
|---|---|---|
| 1 min. | 2.03 | 1.40 |
| 2 min. | 2.08 | 1.60 |
| 4 min. | 2.16 | 1.98 |
| 8 min. | 2.04 | 1.98 |

Although solvent washing removed some surface UV absorber, the solvent washing either did not remove all of it, or the 1 minute oven bake did not drive the screener very deeply into the polycarbonate surface, because subsequent oven baking of the 1 minute and 8 minute film strips at 129° C. for 20 hours resulted in considerable absorbance loss for the 1 minute film:

20 hour bake/1 minute processed film—1.17

20 hour bake/8 minute processed film—1.94

EXAMPLE 8

Pieces of film were impregnated according to the procedure of Example 2, using the Tinuvin 1130 dimeric, UV absorber dissolved at six different wt % concentrations in 50/50 PM/EB. All of the films were oven processed at 129° C. for 5 minutes to effect impregnation. The absorbance of bottom-cut samples was measured at 343 nm and for those having absorbance >3 (the upper limit of measurement for the spectrophotometer), the range of wavelength at which absorbance was >3 was recorded. The results are shown in Table 6.

TABLE 6

| Concentration | Absorbance |
|---|---|
| 2% | 0.98 |
| 3% | 1.53 |
| 4% | 2.08 |
| 5% | 2.68 |
| 6% | >3 at 350–334 nm |

TABLE 6-continued

| Concentration | Absorbance |
|---|---|
| 7% | >3 at 355–329 nm |

EXAMPLE 9

The UV absorbers employed in the process of this application show excellent permanence compared with screeners of lower molecular weight. Films were surface impregnated as in Example 2, and the absorbance loss was measured as a function of oven aging time at 129° C. The results are shown in Table 7. The UV absorbers identified in Table 7 were as follows. 1. A benzoate ester derivative of the formula

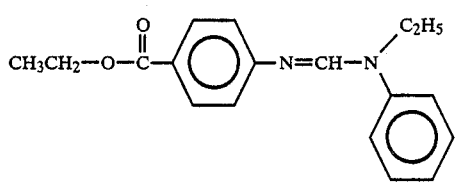

sold under the trademark, Givsorb UV-2; 2.2-(2'-hydroxy)-5'-isooctylphenyl)benzotriazole; sold as Cyasorb 5411 by American Cyanamid Corp.; 3.2-hydroxy-4-n-dodecyloxybenzyophenone, sold as DOBP by Eastman Chemicals; 4. Tinuvin 900 (identified in Example 4); 5. Tinuvin 1130 (identified in Example 3); 6. The benzotrizole dimer identified in Example 1; 7. A benzotriazole dimer identical to that identified in Example 2, except that $R_3$ is —$CH_2CH_2$—$OCH_2CH_2)_2$.

TABLE 7

| Absorber | M.W. | Absorbance After Heating | | | | | | | |
|---|---|---|---|---|---|---|---|---|---|
| | | 0 Hrs | ¼ Hr | ½ Hr | 1 Hr | 2 Hr | 4 Hr | 8 Hr | 16 Hr |
| 1 | 296 | 2.45 | 2.41 | 2.38 | 2.27 | 2.17 | 2.02 | 1.87 | 1.78 |
| 2. | 323 | 2.40 | 2.01 | 1.87 | 1.73 | 1.65 | 1.51 | 1.40 | 1.33 |
| 3. | 382 | 2.68 | 2.63 | 2.60 | 2.47 | 2.25 | 2.11 | 1.94 | 1.86 |
| 4. | 447 | 2.32 | 2.28 | 2.23 | 2.20 | 2.16 | 2.07 | 2.00 | 1.94 |
| 5. | 606 | 2.73 | 2.73 | 2.71 | 2.70 | 2.73 | 2.73 | 2.74 | 2.75 |
| 6. | 760 | 2.73 | 2.70 | 2.69 | 2.68 | 2.64 | 2.63 | 2.61 | 2.60 |
| 7. | 942 | 2.60 | 2.60 | 2.58 | 2.57 | 2.57 | 2.61 | 2.62 | 2.56 |

EXAMPLE 10

Polycarbonate sheets, 3/16" thick, were impregnated with 5 wt % of solution of the benzotriazole dimer UV-absorber identified as compound no. 7 in Example 9 in 50/50 PM/EB according to the method of Example 1. A piece of polycarbonate film was attached to the sheet during processing and then used for absorbance measurement against an untreated reference film. It showed an absorbance of 2.70 at the 342 nm peak. Portions of the impregnated sheet were thermoformed over blocks with a three inch draw, then reheated and pressed flat. One portion was heated at 132° C. for 20 hours. Both of these samples were exposed to UV light in a UVCON accelerated weathering apparatus along with a piece of impregnated sheet as made for the control. Development of yellowing and haze were measured along with an untreated control. The results are shown in Table 8.

TABLE 8

| Sample | YI/% H | | | |
|---|---|---|---|---|
| | Initial | 900 Hrs | 1800 Hrs | 2700 Hrs |
| As Made | 0.5/0.8 | 1.1/2.5 | 2.8/2.3 | 10.1/3.6 |
| Heated 20 hrs | 0.7/0.8 | 1.4/2.0 | 2.8/2.3 | 5.6/2.2 |
| Thermoformed | 0.5/2.0 | 4.1/4.6 | 5.3/3.1 | 11.7/7.8 |
| Control | 0.1/0.3 | 12.2/3.1 | — | — |

EXAMPLE 11

Impregnation of the surface of a polycarbonate sheet with a UV screening agent results in considerable softening and lowering of the Tg of the surface layer. This softening is readily measured as haze development by scuffing the surface with a Taber Abraser. Subsequent heating of the abraded surface to temperatures about 5 to 8° C. below the Tg of the polycarbonate results in healing of the surface defects (light scuffs and scratches) without deformation of the plastic part. This softening of the surface is reduced by subsequent heat treatment.

To demonstrate this effect, 4" squares were cut from a polycarbonate sheet impregnated with the benzotriazole dimer identified as compound no. 7 in Example 9. Using a Teledyne Taber Model 503 standard abrasion tester with CS-10f wheels under 250g load, 25 cycle abrasion tests were run on front (impregnated) and back sides of two squares and on front side of squares which had been heated in a 127° C. oven for various lengths as indicated in Table 9 below.

TABLE 9

| Sample | | % Haze Developed |
|---|---|---|
| Back side Control | | 22.2 |
| Front side Control | | 31.5 |
| Front side heated | 5 min. | 30.7 |
| " | 10 min. | 30.2 |
| " | 20 min. | 27.8 |
| " | 40 min. | 27.6 |
| " | 80 min. | 26.8 |
| " | 160 min. | 25.9 |
| " | 320 min. | 25.4 |

EXAMPLE 12

The samples of Example 11 were reheated at 127° C. for 16 hours and haze in the Taber track were remeasured. The backside control was reduced to 16.3% haze, and the others were all 1.0>0.4% haze. The original 0, 40 and 320 min. samples were given another 25 cycles of 250 g load Taber abrasion and they then read 25.4, 26.5 and 25.2% haze respectively. After another period of 1.5 hours in the oven at 127° C. their haze was reduced to 2.4, 2.7 and 2.1%, respectively. Thus, the removal of surface defects by heating is a relatively permanent feature of surface impregnation.

EXAMPLE 13

Similarly to Example 12, a square of the impregnated sheet was lightly rubbed with fine steel wool over ½ the impregnated side. Haze on each half read 0.7% and 28.3%. After 30 minutes in a 260° F. oven, a few of the deeper scratches on the steel wool-rubbed side remained visible, but the haze meter gave a reading of 0.7% in both areas.

We claim:
1. A process for producing a thermoplastic article having resistance to degradation by ultraviolet radiation, comprising impregnating the surface of the ther- moplastic article with a UV-absorbing effective amount of a solution of a UV absorbing compound of the formula:

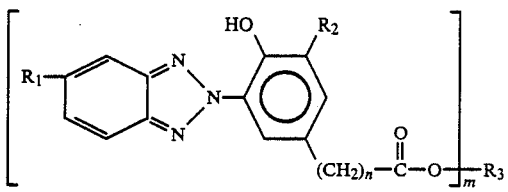

wherein $R_1$ is hydrogen, a halogen, a lower alkyl of from 1 to about 6 carbon atoms or a lower alkoxy of from 1 to about 6 carbon atoms, $R_2$ is hydrogen, halogen, lower alkyl of from 1 to about 6 carbon atoms, or arylsulfonyl, wherein the aryl group contains from 6 to about 10 carbon atoms; n is an integer from 1 to about 4; m is 3; and $R_3$ is a trivalent hydrocarbon radical or lower alkyl ether radical of from 2 to about 22 carbon atoms.

2. The process of claim 1, wherein $R_2$ is hydrogen or a lower branched alkyl group of from 3 to about 6 carbon atoms.

3. The process of claim 1, wherein a solution of the UV-absorbing compound is applied to the surface of the thermoplastic, wherein the solvent is aggressive enough toward the thermoplastic so that it effects impregnation of the UV-absorbing compound into the surface of the thermoplastic yet is not so aggressive as to substantially deleteriously affect the thermoplastic.

4. The process of claim 1, wherein said thermoplastic is a polycarbonate or a polyestercarbonate.

5. The process of claim 1, wherein $R_3$ is —CH$_2$CH$_2$—OCH$_2$CH$_2$)$_y$, wherein y is an integer from about 3 to about 5.

6. The process of claim 1 wherein $R_3$ is —(CH$_2$)$_6$—.

7. The process of claim 1 wherein the UV-absorbing compound is a mixture of a compound wherein $R_3$ is —CH2CH2—OCH2CH2)$_y$ and a compound wherein $R_3$ is —(CH$_2$)$_6$—, wherein y is an integer from about 3 to about 5.

8. The process of claim 1, wherein $R_2$ is tertbutyl.

9. The process of claim 1, wherein said surface impregnating is conducted at an elevated temperature of between 120° C. and 150° C.

10. The process of claim 1, wherein said solvent system is selected from the class consisting of glycols, glycol ethers, alcohols, hydroxy ethers, halogenated hydrocarbons, esters or ketones.

11. The process of claim 9, wherein said solvent system is a mixture of the methyl ether of propylene glycol and 2-butoxyethanol.

12. The process of claim 1, wherein said solution of UV absorbing compound contains an amount of said UV-absorbing compound sufficient to diffuse into the surface layers of said thermoplastic article in concentrations effective to protect said thermoplastic article against degradation by ultraviolet radiation.

13. The process of claim 11, wherein said solution contains from about 4% to about 10% by weight of said UV-absorbing compound.

14. The process of claim 1 wherein said thermoplastic article and said solution are heated to an elevated temperature after said solution is contacted with said article.

15. The process of claim 1, wherein said thermoplastic article is heated to an elevated temperature prior to said solution contacting said article.

16. The process of claim 1, wherein said solution is heated to an elevated temperature prior to said solution contacting said article.

17. A thermoplastic article made according to the process of claim 1.

* * * * *